US007860520B2

(12) United States Patent
Jia et al.

(10) Patent No.: US 7,860,520 B2
(45) Date of Patent: Dec. 28, 2010

(54) METHOD FOR ISSUING PAGING MESSAGES, AND MSC/VLR

(75) Inventors: Yongli Jia, Guangdong (CN); Hao Zhang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 635 days.

(21) Appl. No.: 11/837,167

(22) Filed: Aug. 10, 2007

(65) Prior Publication Data

US 2008/0032715 A1 Feb. 7, 2008

Related U.S. Application Data

(63) Continuation of application No. PCT/CN2006/002154, filed on Aug. 23, 2006.

(30) Foreign Application Priority Data

Aug. 25, 2005 (CN) .................. 2005 1 0093078

(51) Int. Cl.
*H04W 4/00* (2009.01)
(52) U.S. Cl. .................. 455/458; 455/433; 455/466
(58) Field of Classification Search .................. 455/458, 455/433, 466
See application file for complete search history.

(56) References Cited

U.S. PATENT DOCUMENTS 6,546,247 B1 * 4/2003 Foti et al. .................. 455/433
2002/0193139 A1 12/2002 Mildh et al.
2003/0114158 A1 * 6/2003 Soderbacka et al. ......... 455/436
2004/0102199 A1 * 5/2004 Haumont ..................... 455/458

(Continued)

FOREIGN PATENT DOCUMENTS

CN 1299570 A 6/2001

(Continued)

OTHER PUBLICATIONS

Foreign communication from a counterpart application, PCT application PCT/CN2006/002154, English translation Written Opinion dated Dec. 28, 2006, 3 pages.

(Continued)

*Primary Examiner*—George Eng
*Assistant Examiner*—Muthuswamy G Manoharan
(74) *Attorney, Agent, or Firm*—Conley Rose, P.C.; Grant Rodolph

(57) ABSTRACT

The embodiments of the present invention disclose a method for issuing paging messages and an MSC/VLR, the method includes: determining types of networks terminating the process, if the MS only accesses a 2G network; issuing, by the MSC/VLR, paging messages on an RNC, and terminating the process, if the MS only accesses a 3G network; and issuing, by the MSC/VLR, paging messages on both the BSC and RNC, if the MS accesses both the 2G network and the 3G network. According to the embodiments of the present invention, the MSC/VLR can choose to issue paging messages on the BSC or the RNC separately or on both the BSC and the RNC, since it can determine the types of networks accessed by the MS. Thus, unnecessary paging messages issued on the BSC same time, a great deal of radio paging channel resources on the BSC or the RNC is saved, which greatly reduces effects on the process of paging other MSs.

16 Claims, 2 Drawing Sheets

U.S. PATENT DOCUMENTS

2006/0019647 A1* 1/2006 Muhonen et al. ............ 455/419
2007/0113086 A1 5/2007 Huang et al.

FOREIGN PATENT DOCUMENTS

| CN | 1551676 A | 12/2004 |
| CN | 1642083 A | 7/2007 |
| CN | 10041505 C | 8/2008 |
| EP | 1475986 A2 | 11/2004 |
| WO | 99/57935 A1 | 11/1999 |
| WO | 02/0808586 A2 | 10/2002 |

OTHER PUBLICATIONS

Foreign communication from a counterpart application, Chinese application CN200510093078.3, Office action dated Feb. 1, 2008, 22 pages.

Foreign communication from a counterpart application, Chinese application CN200510093078.3, Partial English Translation of Office Action dated Feb. 1, 2008, 2 pages.

"3rd Generation Partnership Project; Technical Specification Group Core Network; Mobile Radio Interface Layer 3 Specification; Core Network Protocols; Stage 3 (Release 5)," 3GPP TS 24.008, v5.12.0 (Jun. 2004).

"Digital Cellular Telecommunications System (Phase 2+); Mobile Stations (MS) Features (GSM 02.07 version 7.1.0 Release 1998)," ETSI TS 100 906, v7.1.0, (Apr. 2004).

* cited by examiner

METHOD FOR ISSUING PAGING MESSAGES, AND MSC/VLR

CROSS-REFERENCE TO RELATED APPLICATIONS

The application is a continuation of PCT application serial number PCT/CN2006/002154 filed Aug. 23, 2006 and entitled "Method for Sending Downward the Paging Information," which claims priority to Chinese application serial number 200510093078.3 filed Aug. 25, 2005 and entitled "Method for Sending Downward the Paging Information."

FIELD OF THE INVENTION

The present invention relates to the paging technology in the field of communications, and more particularly, to a method for issuing paging messages and a Mobile Switching Centre/Visitor Location Register (MSC/VLR).

BACKGROUND OF THE INVENTION

A called MSC/VLR needs to acquire location information of a called Mobile Station (MS), and return the acquired location information of the called MS to a calling MSC/VLR, during the process of setting up a call between a calling MS and the called MS. The calling MSC/VLR establishes a communication link with the called MSC/VLR according to the location information, and then the calling MSC/VLR and the called MSC/VLR proceed a call between the calling MS and the called MS.

The processes of the called MSC/VLR acquiring the location information of the called MS and setting up a signalling connection between a network and the called MS are implemented by issuing paging messages on a Base Station Controller (BSC), or a Radio Network Controller (RNC). For a single-mode MS supporting a Second Generation Mobile Communication System network (2G network), the called MSC/VLR issues paging messages on the BSC; while for a single-mode MS supporting a Third Generation Mobile Communication System network (3G network), the called MSC/VLR issues paging messages in the RNC; for a dual-mode MS supporting 2G and 3G, the called MSC/VLR issues paging messages on both the BSC and RNC.

In the prior art, the 2G and 3G networks may be constructed in similar location area when operators construct the 2G communication network or 3G communication network, since strategies used by the operators to construct communication networks may differ in thousand ways. The MSC/VLR will issue paging messages on both the BSC and RNC in a location area when paging messages are issued to some MSs in the location area where the 2G and 3G networks are constructed, if it is unable to identify whether the MS specifically accesses to the 2G communication network or the 3G communication network in the location area.

In addition, the MSC/VLR will issue paging messages on all BSC/RNCs which are under the control of a core network, so that the paging messages are issued to the intended MS, when location data stored in the VLR by the MS are lost due to such reasons as restarting and the like, or the MSC/VLR cannot find the intended MS in a location area by issuing paging messages time after time.

In this way, if the MS is a single-mode mobile terminal only accessing the 2G network or 3G network, or is a dual-mode mobile terminal only accessing the 2G network or 3G network due to the network restriction, the MSC/VLR will issue paging messages one both the BSC and RNC, which increases the load of BSC or the load of RNC greatly, occupies and wastes a great amount of radio paging channel resources, and affects the process of paging other MSs.

SUMMARY OF THE INVENTION

The embodiments of the present invention provide a method for issuing paging messages and an MSC/VLR, to decrease the load of BSC or the load of RNC, save radio paging channel resources, and reduce the effect on the process of paging other MSs.

The technical solution of the embodiments of the present invention is achieved as follows.

A method for issuing paging messages includes the following processes: determining types of networks accessed by an MS;

issuing paging messages on a BSC by an MSC/VLR and terminating the process, if the MS only accesses a 2G network;

issuing paging messages on an RNC by the MSC/VLR, and terminating the process, if the MS only accesses a 3G network; and issuing paging messages on both the BSC and RNC by the MSC/VLR, if the MS accesses both the 2G network and the 3G network.

An MSC/VLR includes: a first unit which is configured for determining types of networks accessed by an MS;

a second unit which is configured for issuing paging messages on a BSC, and terminating the process, if the MS only accesses a 2G network; issuing paging messages on an RNC, and terminating the process, if the MS only accesses a 3G network; and issuing paging messages on both the BSC and RNC if the MS accesses both the 2G network and the 3G network.

According to the embodiment of the present invention, the MSC/VLR can choose to issue paging messages on the BSC or the RNC separately or on both the BSC and the RNC, since it can determine the types of networks accessed by the MS. Thus, unnecessary paging messages issued on the BSC or the RNC is avoided, which will greatly reduce the load of the BSC or the RNC. Meanwhile, a great deal of radio paging channel resources on the BSC or the RNC is saved, since the MSC/VLR can choose to issue paging messages on the BSC and the RNC separately, or on both the BSC and the RNC, which greatly reduces effects on the process of paging other MSs.

DETAILED DESCRIPTION OF THE INVENTION

A detailed description of the present invention is provides hereinafter with reference to the attached drawings and specific embodiments.

According to the embodiments of the present invention, the MSC/VLR is enabled to determine the types of networks accessed by the MS, so that it may issue paging messages on the BSC or the RNC separately according to the types of networks accessed by the MS, or issue paging messages on both the BSC and RNC. The MSC/VLR issues paging messages on the BSC if the MS can only access the 2G network; the MSC/VLR issues paging messages on the RNC if the MS can only access the 3G network; while the MSC/VLR issues paging messages on both the BSC and RNC if the MS can access both the 2G network and the 3G network.

Figure 1:
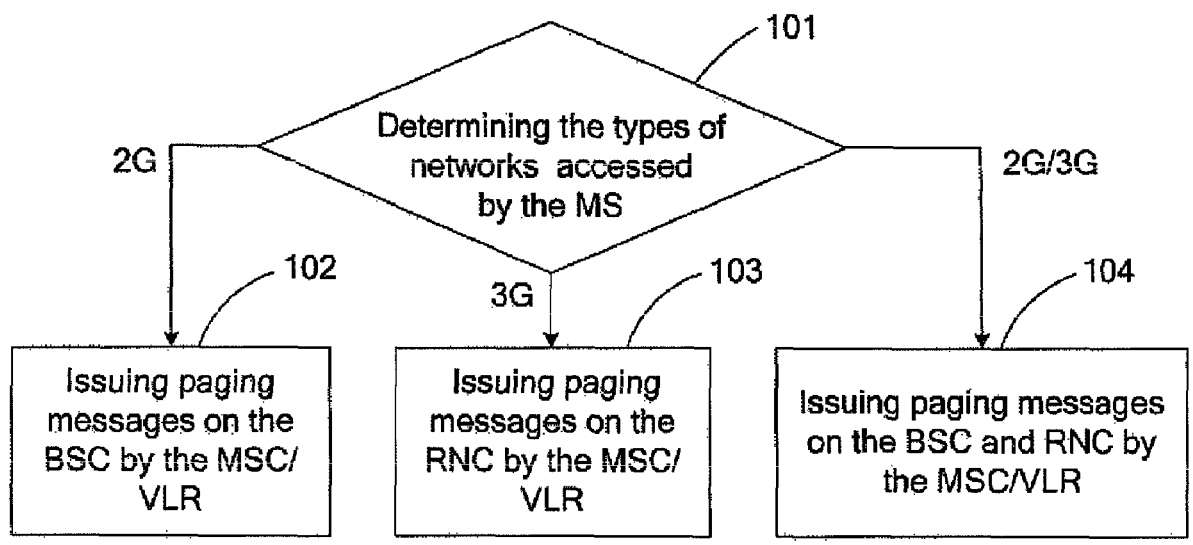
FIG. 1 is a flow chart illustrating a general technical solution for issuing paging message in accordance with an embodiment of the present invention.

FIG. 1 is a flow chart illustrating a general technical solution for issuing paging messages in accordance with an embodiment of the present invention. As shown in FIG. 1, the method for issuing paging messages includes the following steps:

Step 101: determine the types of networks accessed by an MS; proceed to Step 102 if the MS can only access the 2G network; proceed to Step 103 if the MS can only access the 3G network; and proceed to Step 104 if the MS can access both the 2G network and the 3G network, Step 102: an MSC/VLR issues paging messages on the BSC and terminate the process;

Step 103: the MSC/VLR issues paging messages on the RNC and terminate the process; and Step 104: the MSC/VLR issues paging messages on both the BSC and RNC.

According to embodiments of the present invention, there are three modes for determining the types of networks accessed by the MS. The first mode is that the types of networks accessed by the MS is determined according to an International Mobile Subscriber Identifier/Mobile Station International Integrated Service Digital Network Number (IMSI/MSISDN); the second mode is that the types of networks accessed by the MS is determined according to Access Restriction Data (ARD) information; and the third mode is that the types of networks accessed by the MS is determined according to version information submitted by the MS and access capability of the MS.

In the first mode for determining the types of networks accessed by the MS, the types of networks accessed by the MS within a number section can be prescribed according to number sections of IMSI/MSISDN, then the MSC/VLR can determine the types of networks accessed by the MS according to the IMSI/MSISDN of the MS.

When prescribing the types of networks accessed by the MS within a number section according to the number sections of IMSI/MSISDN, an operator configures an MS access network type list in the VLR, the MS access network type list includes a corresponding relationship between the number sections of IMSI/MSISDN and the types of networks accessed. Generally, one number section of IMSI/MSISDN corresponds to a type of network accessed. For example, if the operator prescribes that all MSs within the number section 13522200001~13522299999 can only access the 2G network, a corresponding relationship between a number section of IMSI/MSISDN i.e. 13522200001~13522299999, and a type of network accessed i.e. 2G, is stored in the MS access network type list.

When determining the types of networks accessed by the MS, the MSC/VLR can determine the types of networks accessed by the MS according to the IMSI/MSISDN of the MS and the MS access network type list stored in the VLR. In the above example, if desiring to determine the types of networks accessed by the MS of which the number is 13522206660, the MSC/VLR, according to the number 13522206660 and the corresponding relationship mentioned above, can determine that the type of the network accessed by the MS is the 2G network, that is, the MS can just access the 2G network.

In the second mode for determining the types of networks accessed by the MS, the MSC/VLR can determine the types of networks accessed by the MS according to ARD information subscribed on a Home Location Register (HLR) as well. The ARD information for indicating the types of networks accessed by the MS is subscribed when the MS opens an account.

When roaming to a cell, the MS has to register its location on the HLR of the cell. During the registering procedure, the HLR inserts the ARD information into the VLR through an Insert Subscriber Data message. Upon the reception of the ARD information inserted by the HLR, the VLR stores the ARD information. Thus, when determining the types of networks accessed by the MS, the MSC/VLR can determine the types of networks accessed by the MS according to the ARD information stored in the VLR.

In the third mode for determining the types of networks accessed by the MS, the MSC/VLR can determine the types of networks accessed by the MS according to the version information submitted by the MS and the access capability of the MS.

The version information of the MS is contained in a Revision level parameter of classmark1 information submitted by the MS to the MSC/VLR. If the version information of the MS indicates that the version of the MS is the one before R99, the MSC/VLR thus determines that the MS can just access the 2G network. If the version information of the MS indicates that the version of the MS is the R99 or the one after R99, the MSC/VLR further needs to determine the access capability of the MS, and determines the types of networks accessed by the MS according to the access capability of the MS.

The access capability of the MS is generally stored in the VLR. In the VLR, the attribute of MS is stored according to a data structure. The data structure at least includes an IMSI number, an MSISDN, subscription information, access capability and the like. When desiring to issue paging messages to an MS, the MSC/VLR can find, in the data structure, the access capability of the MS according to the IMSI/MSISDN of the MS.

The access capability of the MS is acquired by the MSC/VLR through the following steps.

At first, the MSC/VLR determines that the MS is capable of accessing the network according to the type of the network accessed by the MS; for instance, if the MS accesses through the 3G network, the MSC/VLR can determine that the MS is capable of accessing the 3G network, if the MS accesses through the 2G network, the MSC/VLR can determine that the MS is capable of accessing the 2G network. Since the process of the MSC/VLR determining the type of the network accessed by the MS can be implemented easily, there is no description in detail.

Secondly, the MSC/VLR, according to the classmark1 information submitted by the MS, determines whether the MS is capable of accessing the 2G network; and according to the classmark3 information submitted by the MS, determines whether the MS is capable of accessing the 3G network.

According to the prescription of 3GPP TS 0207 B.1.19, the MS in a Global System Mobile (GSM) network supports A5/1 encryption algorithm, and the information of A5/1 encryption algorithm can be acquired from the "A5/1" of the classmark1 information submitted by the MS.

If the MS has accessed the 3G network, and the MSC/VLR determines that the MS is capable of accessing the 2G network since the MS supports the A5/1 algorithm when checking the classmark1 information submitted by the MS, it can be determined that the MS can access both the 2G network and the 3G network. If the MS does not support the A5/1 algorithm, it can be determined that the MS is not capable of accessing the 2G network, and further determined that the MS can only access the 3G network.

If the MS has accessed the 2G network, the MSC/VLR can command the MS to submit classmark3 information through a classmark request message, the classmark3 information includes content about whether the MS is capable of accessing the 3G network. Upon reception of the classmark3 information submitted by the MS, the MSC/VLR determines whether the MS is capable of accessing the 3G network by checking whether the following four flag bits, "UMTS FDD Radio Access Technology Capability", "UMTS 3.84 Mcps TDD Radio Access Technology Capability" "CDMA 2000 Radio Access Technology Capability" and "UMTS 1.28 Mcps TDD Radio Access Technology Capability" have been set. If one of the four flag bits has been set, the MS supports the corresponding technology in the 3G network, and thus is capable of accessing the 3G network. For example, if the flag bit "UMTS FDD Radio Access Technology Capability" has been set, the MS supports the UMTS FDD technology in the 3G network, and thus is capable of accessing the 3G network. Practically, if the MSC/VLR can not acquire the classmark3 information through the classmark request message, or the four flag bits have not been set, the MS is not capable of accessing the 3G network.

If the MS is capable of accessing the 3G network it can be determined that the MS can access both the 2G network and the 3G network; if the MS is not capable of accessing the 3G network, it can be determined that the MS can only access the 2G network.

Lastly, after acquiring the access capability of the MS, the MSC/VLR stores the access capability of the MS. By doing so, when desiring to issuing paging messages to an MS, the MSC/VLR can inquire about, in the data structure stored in the VLR, the access capability of the MS according to the IMSI/MSISDN of the MS, and determine the types of networks accessed by the MS according to the access capability of the MS.

Figure 2:
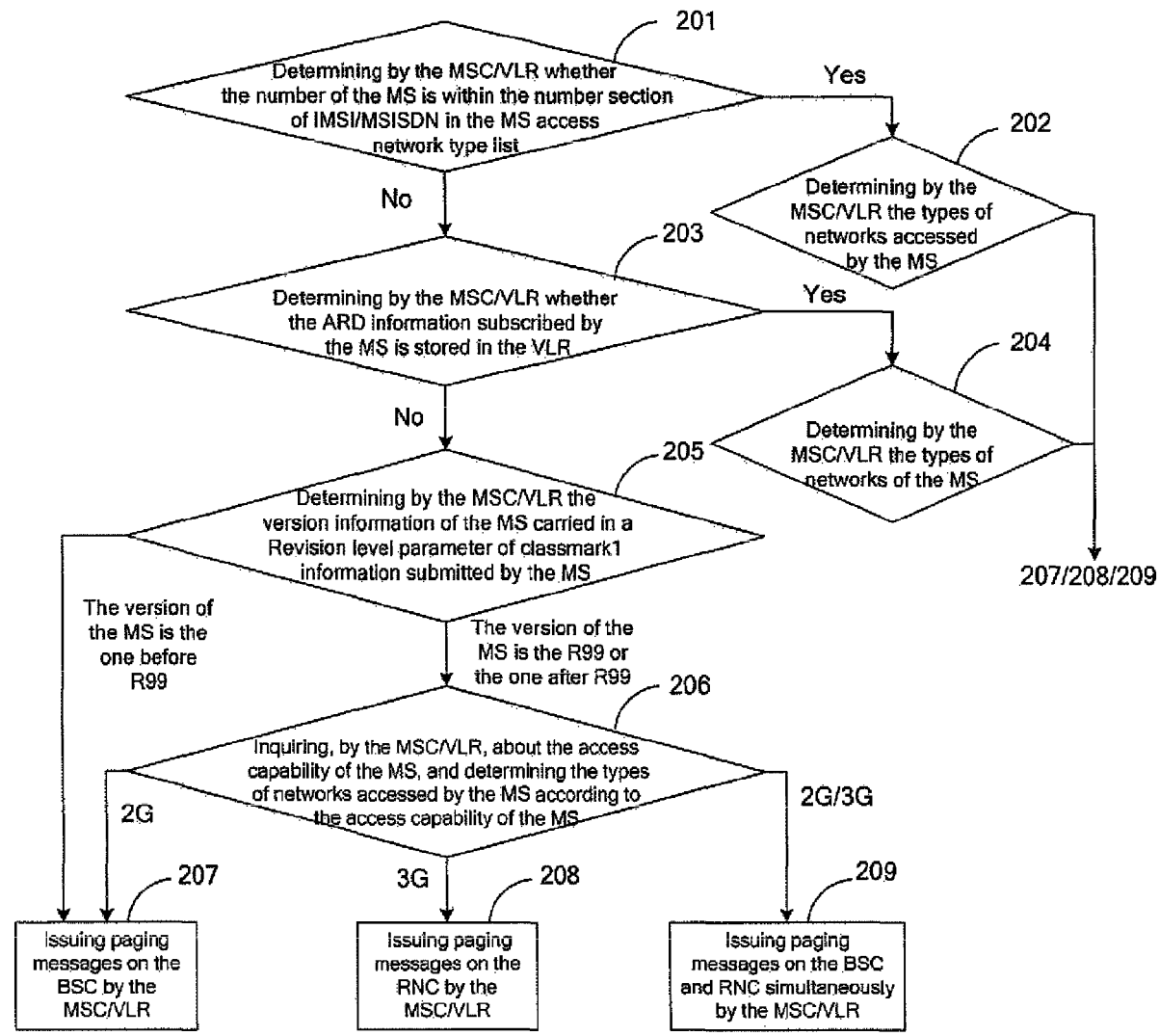
FIG. 2 is a flow chart illustrating a method for issuing paging messages in accordance with another embodiment of the present invention.

FIG. 2 is a flow chart illustrating a method for issuing paging messages in accordance with another embodiment of the present invention. As shown in FIG. 2, the method mainly includes the following steps:

Step 201: an MSC/VLR inquires about an MS access network type list configured in a VLR, and determines whether the number of the MS where paging messages are issued is within the number section of IMSI/MSISDN in the MS access network type list; if the number of the MS where paging messages are issued is within the number section of IMSI/MSISDN in the MS access network the list, proceed to Step 202; otherwise, proceed to Step 203;

Step 202: the MSC/VLR determines the types of networks accessed by the MS according to the number of the MS and the MS access network type list; proceed to Step 207 if the MS can only access the 2G network; proceed to Step 208 if the MS can only access the 3G network; and proceed to Step 209 if the MS can access both the 2G network and the 3G network;

Step 203: the MSC/VLR determines whether ARD information subscribed by the MS is stored in the VLR; if the ARD information subscribed by the MS is stored in the VLR, proceed to Step 204; otherwise, proceed to Step 205;

Step 204: the MSC/VLR determines the types of networks accessed by the MS according to the ARD information subscribed by the MS; proceed to Step 207 if the MS can only access the 2G network; proceed to Step 208 if the MS can only access the 3G network; and proceed to Step 209 if the MS can access both the 2G network and the 3G network;

Step 205: the MSC/VLR determines version information of the MS carried in a Revision level parameter of classmark1 information submitted by the MS; if the version information of the MS indicates that the version of the MS is the one before R99, the MSC/VLR determines that the MS can only access the 2G network and proceed to Step 207; if the version information of the MS indicates that the version of the MS is the R99 or the one after R99, proceed to Step 206;

Step 206: the MSC/VLR inquires about, in the data structure stored in the VLR, the access capability of the MS according to the IMSI/MSISDN of the MS, and determines the types of networks accessed by the MS according to the access capability of the MS; if the MS is only capable of accessing the 2G network, proceed to Step 207; if the MS is only capable of accessing the 3G network, proceed to Step 208; if the MS is capable of accessing the 2G network and the 3G network, proceed to Step 209;

Step 207: the MSC/VLR issues paging messages on the BSC, and terminate the process;

Step 208: the MSC/VLR issues paging messages on the RNC, and terminate the process;

Step 209: the MSC/VLR issues paging messages on both the BSC and RNC.

In this embodiment in the present invention, the MSC/VLR determines the types of networks accessed by the MS according to the ARD information stored in the VLR, if it is unable to determine the types of networks accessed by the MS according to the IMSI/MSISDN of the MS and the MS access network type list stored in the VLR; if it is still unable to determine the types of networks accessed by the MS according to the ARD information stored in the VLR, the MSC/VLR determines the types of networks accessed by the MS according to the version information submitted by the MS and the access capability of the MS.

In practical applications, the MSC/VLR can determine the types of networks accessed by the MS according to any one of: IMSI/MSISDN of the MS and the MS access network type list stored in the VLR, the ARD information stored in the VLR, and the version information submitted by the MS and the access capability of the MS.

In addition, the MSC/VLR can determine, in any order, the types of networks accessed by the MS according to any off: IMSI/MSISDN of the MS and the MS access network type list stored in the VLR, the ARD information stored in the VLR, and the version information submitted by the MS and the access capability of the MS separately, as long as the types of networks accessed by the MS can be determined.

For instance, if it is unable to determine the types of networks accessed by the MS according to IMSI/MSISDN of the MS and the MS access network type list stored in the VLR, the MSC/VLR can determine the types of networks accessed by the MS according to any one of: the ARD information stored in the VLR, the version information submitted by the MS and the access capability of the MS.

Optionally, if it is unable to determine the types of networks accessed by the MS according to the ARD information stored in the VLR, the MSC/VLR can determine the types of networks accessed by the MS according to any one of: IMSI/MSISDN of the MS and the MS access network type list stored in the VLR, the version information submitted by the MS and the access capability of the MS.

Optionally, if it is unable to determine the types of networks accessed by the MS according to the version information submitted by the MS and the access capability of the MS, the MSC/VLR can determine the types of networks accessed by the MS according to any one of: IMSI/MSISDN of the MS and the MS access network type list stored in the VLR, the ARD information stored in the VLR.

In addition, the MSC/VLR can determine, in any order, the types of networks accessed by the MS according to: IMSI/

MSISDN of the MS and the MS access network type list stored in the VLR, the ARD information stored in the VLR, the version information submitted by the MS and the access capability of the MS separately.

For example, if it is unable to determine the types of networks accessed by the MS according to IMSI/MSISDN of the MS and the MS access network type list stored in the VLR, the MSC/VLR can determine the types of networks accessed by the MS according to the version information submitted by the MS and the access capability of the MS; if it is still unable to determine the types of networks accessed by the MS according to the version information submitted by the MS and the access capability of the MS, the MSC/VLR can determine the types of networks accessed by the MS according to the ARD information stored in the VLR.

Optionally, if it is unable to determine the types of networks accessed by the MS according to the version information submitted by the MS and the access capability of the MS, the MSC/VLR can determine the types of networks accessed by the MS according to the IMSI/MSISDN of the MS and the MS access network type list stored in the VLR; if it is still unable to determine the types of networks accessed by the MS according to the IMSI/MSISDN of the MS and the MS access network type list stored in the VLR, the MSC/VLR can determine the types of networks accessed by the MS according to the ARD information stored in the VLR.

Optionally, if it is unable to determine the types of networks accessed by the MS according to the version information submitted by the MS and the access capability of the MS, the MSC/VLR can determine the types of networks accessed by the MS according to the ARD information stored in the VLR; if it is still unable to determine the types of networks accessed by the MS according to the ARD information stored in the VLR, the MSC/VLR can determine the types of networks accessed by the MS according to the IMSI/MSISDN of the MS and the MS access network type list stored in the VLR.

Optionally, if it is unable to determine the types of networks accessed by the MS according to the ARD information stored in the VLR, the MSC/VLR can determine the types of networks accessed by the MS according to the IMSI/MSISDN of the MS and the MS access network type list stored in the VLR; if it is still unable to determine the types of networks accessed by the MS according to the IMSI/MSISDN of the MS and the MS access network type list stored in the VLR, the MSC/VLR can determine the types of networks accessed by the MS according to the version information submitted by the MS and the access capability of the MS.

Optionally, if it is unable to determine the types of networks accessed by the MS according to the ARD information stored in the VLR, the MSC/VLR can determine the types of networks accessed by the MS according to the version information submitted by the MS and the access capability of the MS; if it is still unable to determine the types of networks accessed by the MS according to the version information submitted by the MS and the access capability of the MS, the MSC/VLR can determine the types of networks accessed by the MS according to IMSI/MSISDN of the MS and the MS access network type list stored in the VLR.

It can be seen from the embodiments provided by the present invention that, the MSC/VLR can issue paging messages on the BSC or the RNC separately, or on both the BSC and the RNC, according to the types of networks accessed by the MS, since the types of networks accessed by the MS can be acquired through the method for issuing paging messages in accordance with the embodiments of the present invention. The MSC/VLR issues paging messages on the BSC if the MS can only access the 2G network, the MSC/VLR issues paging messages on the RNC if the MS can only access the 3G network; while the MSC/VLR issues paging messages on both the BSC and RNC if the MS can access both the 2G network and the 3G network.

According to the embodiments of the present invention, the MSC/VLR can choose to issue paging messages on the BSC or the RNC separately or on both the BSC and the RNC, since it can determine the types of networks accessed by the MS. Thus, unnecessary paging messages issued on the BSC or the RNC are avoided, which greatly reduces the load of the BSC or the load of the RNC. At the same time, a great deal of radio paging channel resources on the BSC or the RNC are saved, since the MSC/VLR can choose to issue paging messages on the BSC or the RNC separately, or on both the BSC and the RNC, which greatly reduces effects on the process of paging other MSs.

The purpose technical solution and merits of the present invention have been further described in detail by the above embodiments. It should be appreciated that the foregoing is only preferred embodiments of the present invention and is not for use in limiting the present invention. Any modification, equivalent substitution, improvement to the present invention should be covered in the present invention.

What is claimed is:

1. A method for issuing paging messages, comprising:
determining, by a Mobile Switching Center (MSC)/Visited Location Register (VLR), whether an Access Restriction Data (ARD) information of a Mobile Station (MS) is stored in the VLR, wherein the ARD information indicates types of networks accessed by the MS;
if the ARD information is stored in the VLR, determining, by the MSC/VLR, the types of networks accessed by the MS according to the ARD information stored in the VLR;
if the ARD information is not stored in the VLR, inquiring, by the MSC/VLR, about a version information submitted by the MS; determining that the MS accesses a Second Generation Mobile Communication System network (2G network) if the version of the MS is the one before R99; inquiring, by the MSC/VLR, about an access capability of the MS in a data structure for storing attributes of the MS in the VLR according to an International Mobile Subscriber Identifier (IMSI)/Mobile Station International Integrated Service Digital Network Number (MSISDN) of the MS if the version of the MS is the R99 or the one after R99; and determining that the MS only accesses the 2G network if the MS is only capable of accessing the 2G network; determining that the MS only accesses a Third Generation Mobile Communication System network (3G network) if the MS is only capable of accessing the 3G network; and determining that the MS accesses both the 2G and 3G networks if the MS is capable of accessing both the 2G and 3G networks, wherein the data structure for storing the attributes of MS in the VLR comprises IMSI number, the MSISDN, subscription information, and the access capability;
issuing, by the MSC/VLR, paging messages on a Base Station Controller (BSC) and terminating the process if the MS only accesses the 2G network;
issuing, by the MSC/VLR, paging messages on a Radio Network Controller (RNC) and terminating the process if the MS only accesses the 3G network; and
issuing, by the MSC/VLR, paging messages on both the BSC and RNC if the MS accesses both the 2G network and the 3G network.

2. The method of claim 1, further comprising:
   determining, by the MSC/VLR, the types of networks accessed by the MS according to the IMSI/MSISDN and an MS access network type list stored in the VLR.
3. The method of claim 2, wherein the MS access network type list comprises a corresponding relationship between a number section of IMSI/MSISDN and the types of networks accessed by the MS.
4. The method of claim 1, wherein the ARD information is inserted into the VLR by a Home Location Register (HLR) through an Insert Subscriber Data message during a process of location registration.
5. The method of claim 1, wherein the ARD information is subscribed while the MS opens an account and is used for indicating the types of networks accessed by the MS.
6. The method of claim 1, wherein the version information is contained in a Revision level parameter of classmark1 information submitted to the MSC/VLR by the MS.
7. A Mobile Switching Center (MSC)/Visited Location Register (VLR), comprising:
   a first unit, for determining whether an Access Restriction Data (ARD) information of a Mobile Station (MS) is stored in the VLR, wherein the ARD information indicates types of networks accessed by the MS; if the ARD information is stored in the VLR, determining the types of networks accessed by the MS according to the ARD information stored in the VLR; if the ARD information is not stored in the VLR, inquiring about a version information submitted by the MS; determining that the MS accesses a Second Generation Mobile Communication System network (2G network) if the version of the MS is the one before R99; inquiring about an access capability of the MS in a data structure for storing attributes of the MS in the VLR according to an International Mobile Subscriber Identifier (IMSI)/Mobile Station International Integrated Service Digital Network Number (MSISDN) of the MS if the version of the MS is the R99 or the one after R99; and determining that the MS only accesses the 2G network if the MS is only capable of accessing the 2G network; determining that the MS only accesses a Third Generation Mobile Communication System network (3G network) if the MS is only capable of accessing the 3G network; and determining that the MS accesses both the 2G and 3G networks if the MS is capable of accessing both the 2G and 3G networks, wherein the data structure for storing the attributes of MS in the VLR comprises IMSI number, the MSISDN, subscription information, and the access capability; and
   a second unit, for issuing paging messages on a Base Station Controller (BSC), and terminating the process if the MS only accesses a Second Generation Mobile Communication System network (2G network); issuing paging messages on a Radio Network Controller (RNC) and terminating the process if the MS only accesses a Third Generation Mobile Communication System network (3G network); and issuing paging messages on both the BSC and RNC if the MS accesses both the 2G network and the 3G network.
8. The MSC/VLR of claim 7, wherein the first unit is configured for determining the types of networks accessed by the MS according to the IMSI/MSISDN and an MS access network type list stored in the VLR.
9. The method of claim 8, wherein the MS access network type list comprises a corresponding relationship between a number section of IMSI/MSISDN and the types of networks accessed by the MS.

10. The method of claim 7, wherein the ARD information is inserted into the VLR by a Home Location Register (HLR) through an Insert Subscriber Data message during a process of location registration.
11. The method of claim 7, wherein the ARD information is subscribed while the MS opens an account and is used for indicating the types of networks accessed by the MS.
12. A method for issuing paging messages, comprising:
   determining, by a Mobile Switching Center (MSC)/Visited Location Register (VLR), the types of networks accessed by a Mobile Station (MS) according to an Access Restriction Data (ARD) information of the MS stored in the VLR, wherein the ARD information indicates types of networks accessed by the MS and the ARD information is inserted into the VLR by a Home Location Register (HLR) through an Insert Subscriber Data message during a process of location registration;
   inquiring, by the MSC/VLR, about a version information submitted by the MS;
   determining that the MS accesses the 2G network if the version of the MS is the one before R99;
   inquiring, by the MSC/VLR, about an access capability of the MS in a data structure for storing attributes of the MS in the VLR according to the IMSI/MSISDN of the MS if the version of the MS is the R99 or the one after R99;
   determining that the MS only accesses the 2G network if the MS is only capable of accessing the 2G network; determining that the MS only accesses the 3G network if the MS is only capable of accessing the 3G network; and determining that the MS accesses both the 2G and 3G networks if the MS is capable of accessing both the 2G and 3G networks;
   issuing, by the MSC/VLR, paging messages on a Base Station Controller (BSC) and terminating the process if the MS only accesses a Second Generation Mobile Communication System network (2G network);
   issuing, by the MSC/VLR, paging messages on a Radio Network Controller (RNC) and terminating the process if the MS only accesses a Third Generation Mobile Communication System network (3G network); and
   issuing, by the MSC/VLR, paging messages on both the BSC and RNC if the MS accesses both the 2G network and the 3G network.
13. The method of claim 12, further comprising:
   determining, by the MSC/VLR, the types of networks accessed by the MS according to an International Mobile Subscriber Identifier (IMSI)/Mobile Station International Integrated Service Digital Network Number (MSISDN) and an MS access network type list stored in the VLR.
14. The method of claim 13, wherein the MS access network type list comprises a corresponding relationship between a number section of IMSI/MSISDN and the types of networks accessed by the MS.
15. The method of claim 12, wherein the version information is contained in a Revision level parameter of classmark1 information submitted to the MSC/VLR by the MS.
16. The method of claim 12, wherein the data structure for storing the attributes of MS in the VLR at least comprises one of the following: IMSI number, the MSISDN, subscription information and the access capability.

* * * * *

UNITED STATES PATENT AND TRADEMARK OFFICE
CERTIFICATE OF CORRECTION

PATENT NO. : 7,860,520 B2  
APPLICATION NO. : 11/837167  
DATED : December 28, 2010  
INVENTOR(S) : Yongli Jia and Hao Zhang Page 1 of 1

It is certified that error appears in the above-identified patent and that said Letters Patent is hereby corrected as shown below:

On the Title Page

Item (30) under Foreign Application Priority Data, application number should read "200510093078.3"

Item (57) Abstract should read:

"The embodiments of the present invention disclose a method for issuing paging messages and an MSC/VLR, the method includes: determining types of networks accessed by an MS; issuing, by the MSC/VLR, paging messages on a BSC and terminating the process, if the MS only accesses a 2G network; issuing, by the MSC/VLR, paging messages on an RNC, and terminating the process, if the MS only accesses a 3G network; and issuing, by the MSC/VLR, paging messages on both the BSC and RNC, if the MS accesses both the 2G network and the 3G network. According to the embodiments of the present invention, the MSC/VLR can choose to issue paging messages on the BSC or the RNC separately or on both the BSC and the RNC, since it can determine the types of networks accessed by the MS. Thus, unnecessary paging messages issued on the BSC or the RNC are avoided, which greatly reduces the load of the BSC or the RNC. At the same time, a great deal of radio paging channel resources on the BSC or the RNC is saved, which greatly reduces effects on the process of paging other MSs."

Signed and Sealed this  
Fifteenth Day of February, 2011

David J. Kappos  
*Director of the United States Patent and Trademark Office*